United States Patent
Veeraraghavan et al.

(10) Patent No.: US 10,997,608 B1
(45) Date of Patent: May 4, 2021

(54) SYSTEMS AND METHODS FOR INSULT RATE TESTING AND RECONFIGURING AN AUTOMATED DECISIONING WORKFLOW COMPUTER FOR IMPROVING A MACHINE LEARNING-BASED DIGITAL FRAUD AND DIGITAL ABUSE MITIGATION PLATFORM

(71) Applicant: Sift Science, Inc., San Francisco, CA (US)

(72) Inventors: Rajiv Veeraraghavan, San Francisco, CA (US); Pradhan Bagur Umesh, San Francisco, CA (US); Rishabh Kothari, San Francisco, CA (US); Abbey Chaver, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/083,292

(22) Filed: Oct. 29, 2020

Related U.S. Application Data

(60) Provisional application No. 63/028,985, filed on May 22, 2020, provisional application No. 62/947,436, filed on Dec. 12, 2019.

(51) Int. Cl.
*G06Q 30/00* (2012.01)
*G06F 9/54* (2006.01)
(Continued)

(52) U.S. Cl.
CPC ......... *G06Q 30/0185* (2013.01); *G06F 9/541* (2013.01); *G06N 20/00* (2019.01);
(Continued)

(58) Field of Classification Search
CPC .............. G06Q 10/10; G06Q 30/0185; G06Q 30/0204; G06Q 50/01; G06Q 50/265; G06N 20/00; G06F 9/541
See application file for complete search history.

(56) References Cited

U.S. PATENT DOCUMENTS

| | | | |
|---|---|---|---|
| 2015/0026061 A1* | 1/2015 | Siegel ................ | G06Q 20/4016 705/44 |
| 2016/0063502 A1* | 3/2016 | Adjaoute ........... | G06Q 20/4016 705/44 |

(Continued)

OTHER PUBLICATIONS

Baader, G., & Krcmar, H. (2018). Reducing false positives in fraud detection: Combining the red flag approach with process mining. International Journal of Accounting Information Systems, 31, 1-16. (Year: 2018).*

*Primary Examiner* — William S Brockington, III
(74) *Attorney, Agent, or Firm* — Alce PLLC; Padowithz Alce

(57) ABSTRACT

A system and method for generating an insult rate and reconfiguring an automated decisioning workflow includes configuring a testing group based on sampling from online events having an adverse disposal decision computed by an automated decisioning workflow computer that is configured with machine learning-based threat score thresholds that, if satisfied, causes a computation of a disallow decision or a block decision for a given online event; evaluating a performance and collecting performance data of distinct members of the testing group over a testing period; computing an insult rate for the testing group based on the performance data; computing an insult rate equilibrium for the automated decisioning workflow computer based on the performance data; evaluating the insult rate against the insult rate equilibrium; and reconfiguring adverse decisioning thresholds based on the evaluation of the insult rate of the testing group against the insult rate equilibrium for the automated decisioning workflow computer.

19 Claims, 4 Drawing Sheets

(51) Int. Cl.
*G06N 20/00* (2019.01)
*G06Q 30/02* (2012.01)
*G06Q 50/00* (2012.01)
*G06Q 50/26* (2012.01)
*G06Q 10/10* (2012.01)

(52) U.S. Cl.
CPC ......... *G06Q 10/10* (2013.01); *G06Q 30/0204* (2013.01); *G06Q 50/01* (2013.01); *G06Q 50/265* (2013.01)

(56) References Cited

U.S. PATENT DOCUMENTS

| | | | |
|---|---|---|---|
| 2018/0174170 A1* | 6/2018 | Lo Faro | G06Q 10/067 |
| 2019/0130403 A1* | 5/2019 | Merz | G06Q 20/4016 |
| 2019/0147450 A1* | 5/2019 | Bharghavan | G06Q 20/3224 |
| | | | 705/75 |
| 2020/0050966 A1* | 2/2020 | Enuka | G06N 20/00 |

\* cited by examiner

200

Configuring Automated Workflow S205

Configuring Insult Rate Test S210
  Identifying a Holdout Group S211
  Setting a Sampling Rate S212
  Setting Exclusionary Parameters S213

Monitoring Holdout Test Group S220

Computing Insult Rate S230

Reconfiguring Adverse Decision Threshold S240

Updating Threat Scoring Model S250

FIGURE 2

SYSTEMS AND METHODS FOR INSULT RATE TESTING AND RECONFIGURING AN AUTOMATED DECISIONING WORKFLOW COMPUTER FOR IMPROVING A MACHINE LEARNING-BASED DIGITAL FRAUD AND DIGITAL ABUSE MITIGATION PLATFORM

CROSS-REFERENCE TO RELATED APPLICATIONS

This application claims the benefit of U.S. Provisional Application No. 62/947,436, filed 12 Dec. 2019, and U.S. Provisional Application No. 63/028,985, filed 22 May 2020, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

SUMMARY OF THE INVENTION(S)

In one embodiment, a method for generating an insult rate and reconfiguring a machine learning-based threshold of an automated decisioning workflow includes configuring a testing group based on sampling from a plurality of online events having an adverse disposal decision computed by an automated decisioning workflow computer, wherein the automated decisioning workflow computer is configured with one or more machine learning-based threat score thresholds that, if satisfied, causes the automated decisioning workflow computer to compute a disallow decision or a block decision for a given online event; evaluating a performance and collecting performance data of a plurality of distinct members of the testing group over a testing period; computing an insult rate for the testing group based on the performance data; computing an insult rate equilibrium for the automated decisioning workflow computer based on the performance data; evaluating the insult rate of the testing group against the insult rate equilibrium of the automated decisioning workflow computer; and reconfiguring one or more adverse decisioning thresholds of the automated decisioning workflow computer based on the evaluation of the insult rate of the testing group against the insult rate equilibrium for the automated decisioning workflow computer.

In one embodiment, evaluating the insult rate of the testing group against the insult rate equilibrium for the automated decisioning workflow computer includes: identifying whether the insult rate of the testing group is greater than or less than the insult rate equilibrium of the automated decisioning workflow computer.

In one embodiment, reconfiguring the one or more adverse decisioning thresholds of the automated decisioning workflow computer includes: decreasing the one or more adverse decisioning thresholds of the automated decisioning workflow computer towards the insult rate equilibrium of the automated decisioning workflow computer if the insult rate of the testing group is greater than the insult rate equilibrium of the automated decisioning workflow computer.

In one embodiment, reconfiguring the one or more adverse decisioning thresholds of the automated decisioning workflow computer includes: increasing the one or more adverse decisioning thresholds of the automated decisioning workflow computer towards the insult rate equilibrium of the automated decisioning workflow computer.

In one embodiment, the one or more adverse decisioning thresholds comprise one or more machine learning-based threat scores selected from a scale of machine learning threat scores used for identifying a level of threat of a subject online event or a subject online user.

In one embodiment, reconfiguring the one or more adverse decisioning thresholds of the automated decisioning workflow computer includes: resetting the one or more adverse decisioning thresholds to one or more new machine learning-based threat score values distinct from prior machine learning-based threat score values of the automated decisioning workflow computer.

In one embodiment, the testing group relates to a group of online events and/or a group of online users having machine learning-based threat scores that, when evaluated by the automated decisioning workflow computer, would cause the automated decisioning workflow computer to output a disposal decision for disallowing or for blocking each of member of the group of online events and/or the group of online users.

In one embodiment, the insult rate of the testing group relates to a percentage of members of the testing group having an adjudged adverse disposal decision from the automated decisioning workflow computer that did not produce an observed negative activity consequence during the testing period.

In one embodiment, computing the insult rate of the testing group includes: identifying a number of positive members of the testing group that did not result in a negative activity consequence during the testing period; identify an aggregate number of members of the testing group; and computing a percentage of false positives based on a quotient value calculated by dividing the number of positive members by the aggregate number of members of the testing group.

In one embodiment, the insult rate equilibrium relates to a theoretical automated decisioning threshold value, if set for a given automated decisioning workflow computer, is a point at which a probable cost of automatically allowing and a probable cost of automatically disallowing an online event or an online user evaluated through the automated decisioning workflow computer may be equal.

In one embodiment, computing the insult rate equilibrium of the automated decisioning workflow computer includes: (i) identifying a probability of a missed threat, (ii) identifying a cost value of the missed threat, (iii) identifying a cost value of a false positive decision, (iv) summing the cost value of the missed threat and the cost value of the false positive decision; and (v) computing the cost value of the missed threat divided by the sum of the cost value of the missed threat and the cost value of the false positive decision.

In one embodiment, configuring the testing group includes: selecting as members of the testing group a subset of the plurality of online events sampled from the plurality of online events having the adverse disposal decision computed by the automated decisioning workflow computer.

In one embodiment, selecting the subset includes: automatically accepting online events having a machine learning-based threat score that satisfies an acceptance threshold for the testing group.

In one embodiment, setting the testing group includes: setting one or more exclusionary parameters that exclude specific candidate members from the sampling of the plurality of online events having the adverse disposal decision computed by the automated decisioning workflow computer.

In one embodiment, the method includes tracking each member of the testing group during the testing period; and identifying whether each member produces a positive outcome or a negative outcome based on the tracking.

In one embodiment, a system for generating an insult rate and reconfiguring a machine learning-based threshold of an automated decisioning workflow of a machine learning-based system for identifying and mitigating digital threats includes a distributed network of computers implementing a machine learning-based digital threat mitigation service that: configures a testing group based on sampling from a plurality of online events having an adverse disposal decision computed by an automated decisioning workflow computer, wherein the automated decisioning workflow computer is configured with one or more machine learning-based threat score thresholds that, if satisfied, causes the automated decisioning workflow computer to compute a disallow decision or a block decision for a given online event; evaluates a performance and collecting performance data of a plurality of distinct members of the testing group over a testing period; computes an insult rate for the testing group based on the performance data; computes an insult rate equilibrium for the automated decisioning workflow computer based on the performance data; evaluates the insult rate of the testing group against the insult rate equilibrium of the automated decisioning workflow computer; and reconfigures one or more adverse decisioning thresholds of the automated decisioning workflow computer based on the evaluation of the insult rate of the testing group against the insult rate equilibrium for the automated decisioning workflow computer.

In one embodiment, the one or more adverse decisioning thresholds comprise one or more machine learning-based threat scores selected from a scale of machine learning threat scores used for identifying a level of threat of a subject online event or a subject online user.

In one embodiment, reconfiguring the one or more adverse decisioning thresholds of the automated decisioning workflow computer includes: resetting the one or more adverse decisioning thresholds to one or more new machine learning-based threat score values distinct from prior machine learning-based threat score values of the automated decisioning workflow computer.

In one embodiment, the testing group relates to a group of online events and/or a group of online users having machine learning-based threat scores that, when evaluated by the automated decisioning workflow computer, would cause the automated decisioning workflow computer to output a disposal decision for disallowing or for blocking each of member of the group of online events and/or the group of online users.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
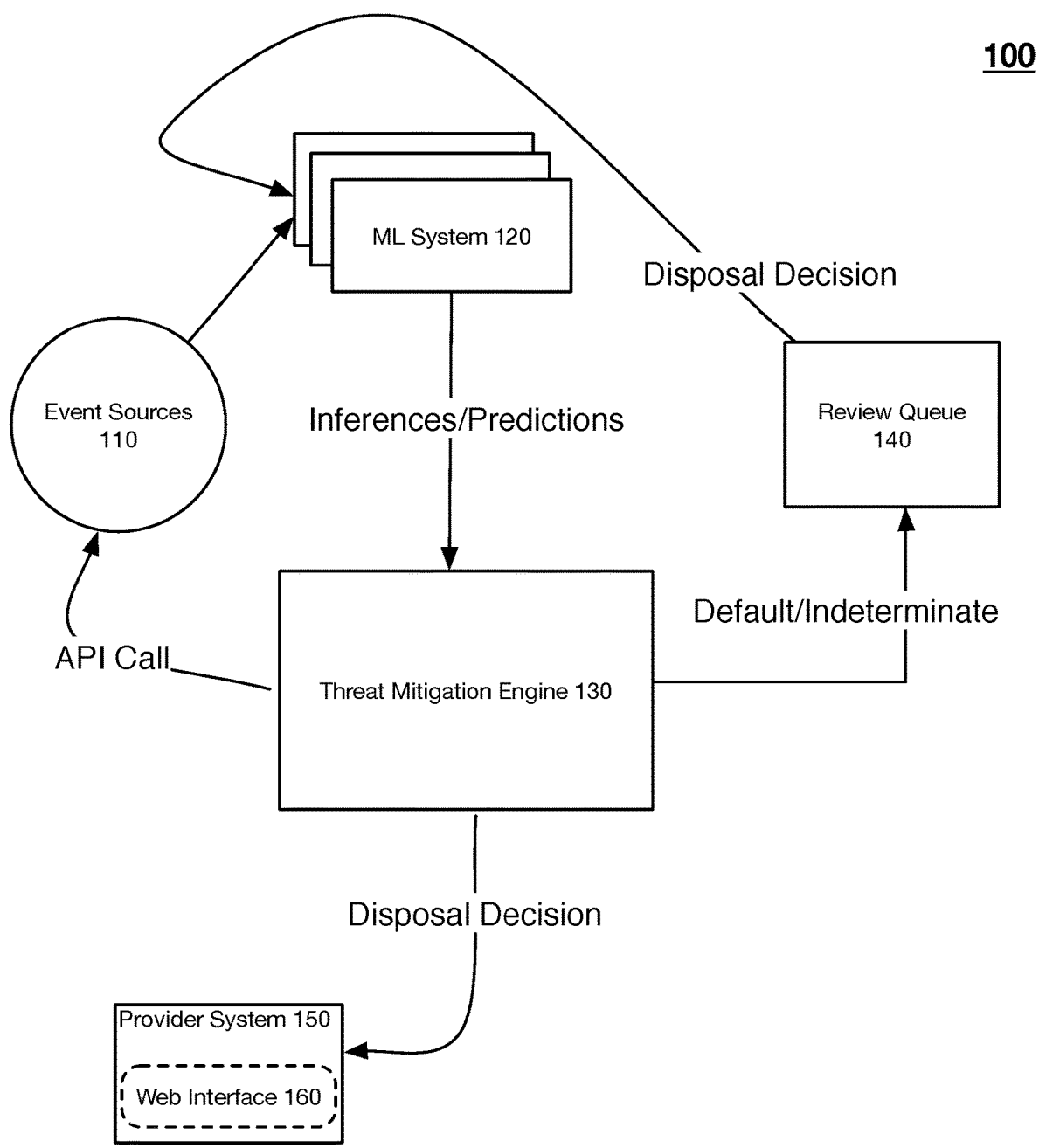
FIG. 1 illustrates a schematic representation of a system in accordance with one or more embodiments of the present application.

The following description of the preferred embodiments of the invention is not intended to limit the invention to these preferred embodiments, but rather to enable any person skilled in the art to make and use this invention.

Overview

As discussed above, digital threats are abounding and continue to evolve to circumvent existing digital fraud detection technologies. The evolving nature of digital threats compounded with the great number of transactions, events, and/or activities (exceeding billions in number) occurring over the web and/or Internet highlight the many deficiencies of traditional digital fraud detection implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital threats stemming from the malicious or fraudulent activities.

The advanced technology platform of several embodiments of the present application employs a robust ensemble of machine learning models, application programming interfaces (APIs), and related systems that operate to ingest the great number of digital activities performed and events occurring over the web and parse from these great number of digital activities and events a subset of these activities and events that present the greatest likelihood of involving digital fraud and/or digital abuse. Accordingly, using these finely tuned and perpetually tunable machine learning models, a system implementing the several embodiments of the present application can predict and/or estimate with high accuracy and, in some embodiments, in real-time (e.g., as the event is occurring or shortly thereafter) a digital threat score for each event or activity that is sifted by the system. The digital threat score may be exposed via a score API that may function to interact with various endpoints of the digital threat mitigation platform. Specifically, the score API may function to interact with one or more web computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation automated workflows or implementations that should be applied to future digital event data and/or current the digital events to mitigate or eliminate a digital threat associated therewith.

Workflows Overview

Additionally, the embodiments of the present application further enable the configuration of new digital threat mitigation automated workflows or implementations automatically upon a detection of a new (or evolved) digital threat or semi-automatically with digital threat input from an entity, as described in U.S. Pat. No. 9,954,879, which is incorporated herein in its entirety by this reference. That is, in some instances, the digital events and activities occurring via the Internet or web (including web and mobile applications) give rise to an unclassified or not fully classified potential digital threat that may require additional or new digital threat mitigation measures that may effectively mitigate the fraud risks associated the digital events. In such instances, the embodiments of the present application employ a digital threat mitigation engine that is capable of building new digital threat mitigation automated workflows or implementations that function to mitigate or eliminate digital threats posed by the unclassified or not fully classified potential digital threat. It shall be noted that, in some embodiments, the digital event posing the potential digital threat may be a classified digital event (e.g., payment abuse), however, due to the digital risks or other risks of loss, enhanced or new digital threat detection automated workflows according to the several embodiments of the present application may need to be implemented in the course of evaluating and processing the digital event.

Using a combination of the digital threat score calculated for a digital actor and/or digital event and a web user interface, the embodiments of the present application enable the definition of new or evolved digital threat mitigation automated workflows executed in association with a digital threat mitigation engine. In particular, via the web user interface, it is possible to identify or define digital events or digital activities occurring over the web or Internet that may be used to trigger a digital intervention (e.g., implementation the new digital threat mitigation automated workflows) and digital event or digital activity processing. The web user interface may similarly be used to define the specific routines and procedures executed by the digital threat mitigation engine once the threat mitigation automated workflows have been triggered.

The digital threat mitigation engine functions to use, as input, a digital threat score and service provider-defined digital threat mitigation automated workflows to generate one or more digital threat mitigation implementations, such as a digital threat mitigation flow. For instance, the digital threat mitigation engine may function to further configure an events API to collect and/or parse events or activity data from multiple events data sources to identify specific events data that may trigger the new digital threat mitigation implementations. In such instance, one aspect of the one or more digital threat mitigation implementations may include digitizing defined threat mitigation policy for integration and enhancement of threat mitigation capabilities of a pre-existing and broader digital threat mitigation service.

1. System for Identifying and Mitigating Threats

As shown in FIG. 1, a system 100 for mitigating digital threats includes a plurality of event sources 110, a machine learning digital fraud detection system 120, a digital threat mitigation engine 130, a review queue 140, a service provider system 150, and web interface 160.

The system 100 may function to enable real-time automatic fraud or abuse detection and augmentation of automatic fraud-detecting capabilities of a pre-existing system. The system 100 may provide web interface 160 that enable subscribers to identify digital circumstances or digital events that may have a high risk of digital fraud and source online activities or digital events to the threat service implementing the system 100. Additionally, the system 100 may be provided with digital fraud mitigation policies that may be used to generate applications and digital process flow (e.g., automated workflows) that can be used to detect the potentially fraudulent events or circumstances and automatically route or dispose the events or circumstances. Accordingly, the system 100 may function to build a digital fraud detection and processing mechanism (workflow) that may be used to augment an existing and broader digital fraud detection system thereby improving an overall technical capability of the broader system to identify digital fraud and deploy fraud mitigation protocols.

The plurality of event sources 110 may function as sources of digital events and digital activities, occurring fully or in part over the Internet or the web. The plurality of events sources may include a plurality of web servers associated with a plurality of entities seeking to mitigate fraudulent activities involving digital resources of said entities or the like. Accordingly, the plurality of event sources no may also include the service provider system 150.

The plurality of event sources no may function to capture and/or record any digital activities and/or digital events occurring over the Internet or web involving the web servers of the entities and/or other digital resources (e.g., web pages, web transaction platforms, Internet-accessible data sources, etc.) of the entities. The digital events and digital activities collected by the plurality of event sources 110 may function as input data sources of the machine learning digital fraud detection system 120. Additionally, or alternatively, the plurality of event sources no may function to interface with an events API of the threat service implementing the system 100 and provide events data directly to the events API.

The machine learning digital fraud detection system 120 may include a score API that may function to identify, predict, or classify the distinct digital events data and digital activity data received from the plurality of event sources no. In a preferred embodiment, the system 120 implementing the score API generates a threat score for each distinct set of events and/or activities received via the events API. The machine learning digital fraud detection system 120 may be implemented by a plurality of computing servers (e.g., a combination of web servers and private servers) that implement an ensemble of machine learning models. The ensemble of machine learning models may include hundreds and/or thousands of machine learning models that work together to classify features of digital events data and namely, to classify or detect features that may indicate a possibility of fraud or not. The machine learning fraud detection system 120 may additionally utilize the input from the plurality of event sources 110 and various other data sources (e.g., outputs of system 100, system 100 derived knowledge data, external entity-maintained data, etc.) to continuously improve or accurately tune weightings associated with factors of the ensemble of the machine learning models.

The ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. The digital threat mitigation engine 130 functions to construct digital threat mitigation flows and implement the constructed digital threat mitigation flows to enable the digital processing of digital events and/or activities having a high susceptibility or probability of fraud, cyber fraud, or other digitally harmful activities. The digital processing functionality of the digital threat mitigation flow may include the detection of digital fraud within the digital events and deployment of digital fraud mitigation protocols. Additionally, or alternatively, the digital processing functionality may include timely and/or real-time processing of the digital events to automated decision or disposal. Using the web interface 160, a client system may be used to construct flow parameters that the digital threat mitigation engine 130 uses to construct digital threat mitigation flows.

The flow parameters provided via the web interface 160 may include a combination of a digital triggering event, a digital actor (e.g., an online user), digital fraud type and associated threat score thresholds for multiple tiers or stages of digital event evaluation, and disposal decisions and/or actions that indicate a disposition of the digital event. The digital triggering event may be any digital action or digital activity initiated by one or more actors that may be used to initiate a digital threat mitigation flow (e.g., an Internet or web occurrence involving a digital resource of or a digital service provided by an entity).

In one embodiment of the present application, the digital threat mitigation engine 130 may then function to ingest the flow parameters and construct the digital threat mitigation flows. Constructing the digital threat mitigation flows by the digital threat mitigation engine 130 may include setting digital triggering event as an initiator of the flow, configuring multi-tiered or multi-staged computing nodes that may be used to determine an automated disposition of the digital triggering event, and configuring computing nodes that process the automated disposition.

Accordingly, in use, the initiation of the digital threat mitigation flow may preferably be triggered by an occurrence (or receipt from a client system) of the defined digital triggering event. The digital threat mitigation flow, using the client-system defined flow parameters, may function to process and/or evaluate the digital triggering event together with an associated digital actor (if provided) until an automated disposal decision or recommendation is generated by the digital threat mitigation engine 130. Generally, the automated disposal decision or recommendation may be transmitted to the service provider system 150 and may also be converted to machine learning input into the machine learning digital threat mitigation system 120. Accordingly, outputs of the digital threat mitigation engine 130 and review queue engine 140 (as described in more detail below) may be routed to the machine learning system 120 for improving of the digital fraud and/or digital abuse detection capabilities thereof.

In one aspect of the digital threat mitigation engine 130, a reviewing queue engine 140 may be implemented in combination with the digital threat mitigation engine 130. The reviewing queue engine 140 may preferably be implemented in the circumstances in which an automated disposition for a digital triggering event may be undiscernible (e.g., a triggering digital event does not match or satisfy evaluation flow parameters of the automated decisioning node or the like) by the automated decisioning node (or similar decisioning node of the digital threat mitigation engine 130 or discernible with very low confidence (e.g., confidence being below a minimum confidence threshold) by the digital threat mitigation engine 130 using a digital threat mitigation flow. In such cases, the digital threat mitigation engine 130 may cease processing the triggering digital event according to the digital threat mitigation flow and as a default, flag the digital event as requiring additional scrutiny or review and transmit the triggering digital event to the reviewing queue engine 140.

In some embodiments, the reviewing queue engine 140 may function to discern the triggering digital events deemed undiscernible by preceding nodes of the digital threat mitigation engine 130. Additionally, or alternatively, the reviewing queue engine 140 may function to discern and provide a disposal decision for any digital event data or triggering digital event that was processed through a default node of a preceding node; meaning that the preceding node may not have been able to provide a disposal decision for the digital event data. The reviewing queue engine 140 may be implemented semi-automatically using a combination of manual and automated reviewing protocols implemented by a computing node (e.g., a computing server, computing processor, etc.) that may function to apply predetermined review rules, heuristics, or judgements for undiscernible digital events. The manual review component of the reviewing queue engine 140 may include one or more human analyst or digital fraud experts that may assist in discerning the digital event by providing review input regarding a perceived fraudulent or abusive nature of the digital event or activity.

The disposal decision generated at the reviewing engine queue 140 together with the review input may, in turn, be converted by the system 100 to useable machine learning input into the machine learning digital fraud detection system 120. Thus, the reviewing queue input and disposal decision may be consumed by the machine learning digital fraud detection system 120 as machine learning training data that may be used to adjust weightings of one or more factors of or add new factors (features) with weightings to the existing machine learning models implemented by the machine learning digital fraud detection system 120 thereby improving the technical capabilities of the machine learning digital fraud detection system 120 to evaluate and determine a digital threat level (e.g., digital threat score) associated with digital event data. Additionally, or alternatively, the reviewing input and disposal decision may be consumed by the machine learning digital fraud detection system 120 or generally, by the system 100 to generate one or more new machine learning models incorporating the weightings and/or factors from the reviewing input. The system 100 may function to augment the existing machine learning models implemented by the machine learning digital fraud detection system 120 with the one or more new machine learning models. Converting the disposal decisioning and reviewing input in this way to form machine learning input effectively evolves the fraud detection and technical operability of the underlying computers implementing the machine learning models. In particular, the system 100 implementing the machine learning models would function to identify fraudulent digital activity with faster and with greater accuracy (e.g., better/improved classifications or predictions of fraud).

The service provider 150 may function to provide digital events data to the one or more digital event processing components of the system 100. Preferably, the service provider 150 provides digital events data to an events application program interface associated with the digital threat mitigation engine 130. The service provider 150 may be any entity or organization having a digital online presence that enable customers or users of the digital resources associated with the entity's online presence to perform transactions, exchanges of data, perform one or more digital activities, and the like. The service provider preferably includes a subscriber to a threat service implementing the system 100 and method 200 described herein.

The web interface 160 may function to enable a client system or client device to operably interact with a remote digital threat mitigation platform of the present application. The web interface 160 may include any suitable graphical frontend that can be accessed via a web browser using a computing device. The web interface 160 may function to provide an interface to provide inputs for constructing a digital threat mitigation application flow. For instance, the web interface 160 may provide multiple intuitive input boxes and instruction for defining a decision tree of logic that may be used in generating the predefined ordered process flow of the digital threat mitigation application flow used for processing digital events data.

Additionally, or alternatively, the web interface 160 may function to enable an administrator of an entity to view and/or manage entity data provided to the system 100 and also status information of any pending digital threat mitigation application flow.

The web interface 160 may be used by an entity to make any suitable request including requests to build new digital threat mitigation process application flows, requests to perform synchronous processing of digital event data, requests for status information of a digital threat mitigation application flow in progress, and the like.

2. Method for Insult Rate Testing and Automated Workflow Improvements

As shown in FIG. 2, the method 200 for insult rate testing and automated workflow improvement includes configuring an insult rate testing S210, implementing a monitoring and/or evaluation of a holdout test group S220, computing an insult rate and/or an insult rate equilibrium S230, and reconfiguring one or more adverse decision thresholds S240. The method 200 may optionally include configuring an automated workflow S205 and improving one or more subscriber-specific threat scoring models.

2.05 Configuring Automated Workflow

Optionally, or additionally, S205, which includes configuring a workflow, may function to enable a subscriber to configure a workflow within the threat service that enables an automatic evaluation and an automatic identification of a disposal decision for routing and/or handling a target activity or event involving one or more online services or resources of the subscriber.

Figure 3:
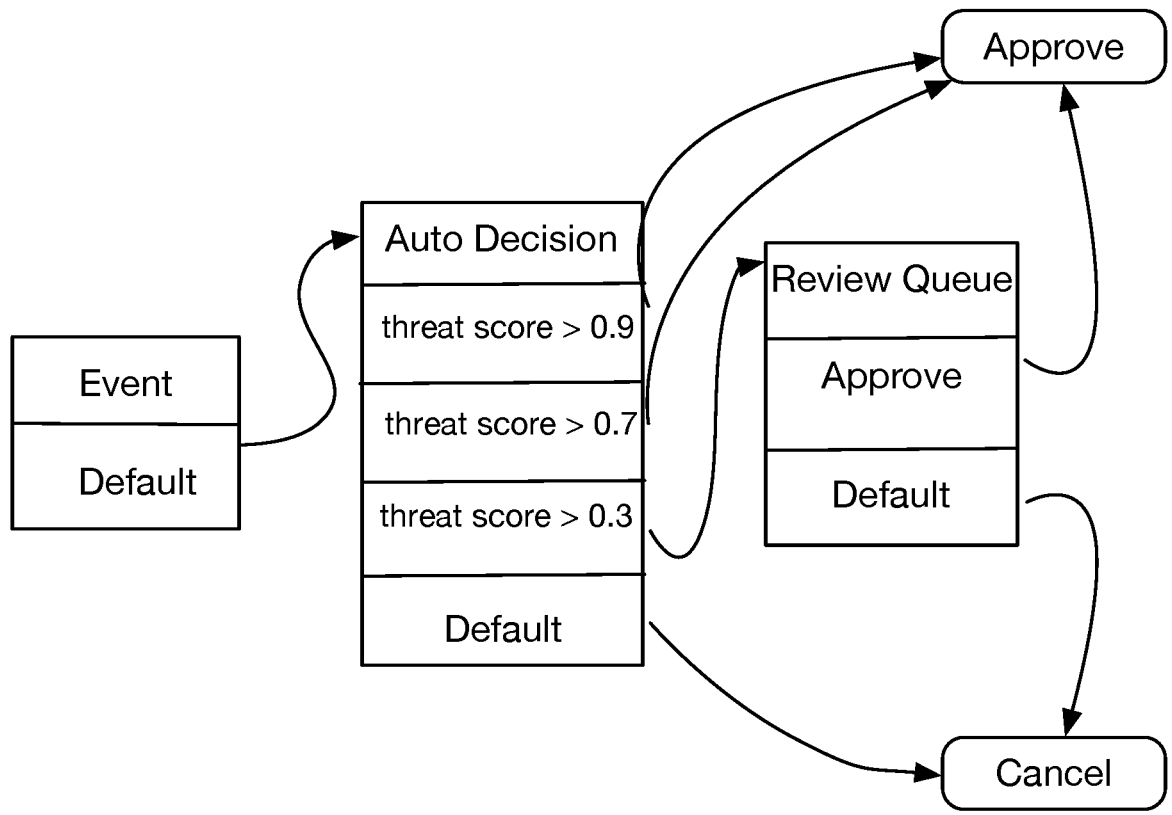
FIG. 3 illustrates a schematic example of an automated workflow in accordance with one or more embodiments of the present application.

In one or more embodiments, S205 may function to set or define one or more evaluation parameters within a given workflow, as shown by way of example in FIG. 3. In a preferred embodiment, the one or more evaluation parameters may include one or more threat score thresholds. In such preferred embodiments, a threat score may be computed for a given activity and the threat score of the given activity evaluated against the one or more threat score thresholds. Additionally, or alternatively, other evaluation parameters (e.g., purchase amount, shipping location, transaction time, and the like), rules, and/or heuristics may be set along with the threat score within an automated workflow for evaluating one or more attributes of an event, activity, and/or transaction.

In a circumstance in which the given workflow includes a plurality of distinct threat score thresholds, S205 may function to set or define a specific routing or handling of a given activity or event for each of the plurality of distinct threat score thresholds. That is, if a threat score for a given activity satisfies or otherwise, falls within a defined threat score range within the workflow, the given activity may be handled by the threat service in a manner ascribed to the threat score or defined threat score range. For instance, for a first threat score range (e.g., 0-50) of a given workflow, a routing rule or handling instruction may allow for an "acceptance" or "allow" for a given activity with a threat score within the first threat score range; in another instance, for a second threat score range (e.g., 90-100) of the given workflow, a second routing rule or second handling instruction may cause for a "cancellation" or "block" for a given activity with a threat score within the second threat score range.

2.1 Configuring False Positive Testing|Insult Monitoring

S210, which includes configuring an insult rate testing for a given subscriber, may function to define one or more experimentation or discovery parameters within one or more threat evaluation processes or pipelines of a threat service to determine a false positive rate or a false decline rate (i.e., insult rate) among activities or transactions of customers of a subscriber to the threat service that may be adjudged as being fraudulent or undesirable by the threat service. In one or more embodiments, S210 may function to enable a subscriber to a digital threat mitigation service implementing the system 100 and/or the method 200 to configure the insult rate testing and/or experimentation via an application programming interface or a web-accessible interface for operating one or more services and/or computing systems of the digital threat mitigation service for implementing the experimentation and discovery.

In a preferred embodiment, S210 may function to configure the insult rate testing with a designated automated workflow for a given subscriber. In such preferred embodiment, the automated workflow may include a computation of one or more threat scores for routing input activities or input events and an automatic computation via the automated workflow of a disposal of the input activities or the input events based on the one or more threat scores, as described in more detail in U.S. Pat. No. 9,954,879, which is incorporated herein in its entirety by this reference. In such embodiments, an automated workflow, which may sometimes be referred to herein as an "automated decisioning workflow computer", may include multiple distinct routes having multiple distinct, corresponding routing thresholds. As an example, a given automated workflow for a subscriber may have a first threshold (e.g., a first minimum threat score value) that, if satisfied, may function to route an input event, input user, input content, or input activity towards a decision for automatically disallowing or blocking. In such example, the given automated workflow may include a second threshold (e.g., a second minimum threat score value) that, if satisfied, may function to route a given input towards a reviewing queue, in which the input into the workflow may not be automatically disallowed or block but additionally evaluated for a disposal decision, such as allowance (acceptance) or disallowance (block/cancel).

Additionally, or alternatively, S210 may function to enable a configuring a plurality of distinct insult rate experimentation or discovery in which a distinct insult rate experiment may be executed in parallel for each distinct route (or decisioning threshold) of a given automated workflow. Thus, enabling route-dependent insult rate experimentation and determination. For example, a first insult rate experiment may be executed for a first route of an automated workflow that passes input events or activities towards disallowance and a second insult rate experiment may be executed for a second route of an automated workflow that routes input events and the like towards a reviewing queue.

Additionally, or alternatively, S210 may function to enable configuring an insult rate experimentation in which an automated decisioning workflow computer may be evaluating and decisioning on multiple distinct digital abuse types (e.g., digital account abuse, digital payment abuse, and the like).

In one or more embodiments, the experimentation or discovery parameters may include parameters for setting or defining a holdout group of candidates, setting or defining a sampling rate, setting or defining a holdout group size, setting or defining an experimentation or discovery period, setting or defining attributes of suitable candidates, and the like.

2.11 Holdout Group|Evaluation Candidates

S210 includes S211, which includes identifying a holdout group, may function to define one or more parameters for setting or identifying a holdout group of candidates from a plurality of evaluated activities or transactions associated with a subscriber. Accordingly, in one or more embodiments, a holdout group as referred to herein may include a subset of a group of activities, a group of events, a group of online users (i.e., customers of a subscriber to the threat service) sampled from a corpus of evaluated activities that may be selected for purposes of experimentation or testing in determining an insult rate for a given subscriber of the threat service. Preferably, each candidate or member of a holdout group may be associated with or otherwise, assigned a computed threat score indicating a probability that the candidate or member involves a level of risk or threat of digital abuse or digital fraud.

In one or more embodiments, the selected candidates defining the holdout group comprise a collection of suspicious online activities, online users, or transactions that may have been adjudged by the threat service (via an automated decisioning workflow) as having a probability of fraud exceeding a threat or fraud threshold such that the threat service may compute a recommendation to block, cancel, or otherwise, disallow each of the online activities or transactions within the collection. That is, in some embodiments, the holdout group of candidates may include a set of digital activities, events, and/or transactions having an adverse disposal out of an automated workflow configured for a given subscriber to the threat service. The adverse disposal may include any type or kind of computed or generated disposition from the automated workflow that blocks, cancels, restricts, limits, and/or otherwise, modifies an ability to complete the activity, event, or transaction through a normal course with the given subscriber.

In a preferred embodiment, S211 may function to enable setting parameters for setting the holdout group of candidates by first or initially configuring the threat service to make available for sampling all activities, events, and/or transactions that are routed out of an automated workflow of a given subscriber with an adverse disposal (i.e., the entire pool of holdout group of candidates). In such embodiments, the activities, events, and/or transactions may be those having a probability of a risky user, a risky event, a risky transaction, risky content that satisfies or exceeds a maximum probability of fraud or threat, as set within the automated workflow for the given subscriber. In a variation, S211 may function to enable a sampling of all activities, events, and/or transaction being input to an automated workflow such that a subset of the input may be re-routed to the holdout group before the input arrives to the automated workflow.

Additionally, or alternatively, S210 which includes S213 may function to enable setting the holdout group of candidates by additionally or secondly setting exclusionary parameters that limit, exclude or otherwise, eliminate specific candidates from the pool of possible holdout group candidates. As an example, S211 may function to set an exclusionary parameter that removes from or limits access to within the pool of holdout group candidates those transactions or activities that satisfy or exceed a maximum value (e.g., above $1000 exclude (exclude >$1000)).

2.12 Sampling Parameters|Rate, Size, Period

Once possible candidates for a holdout group of candidates may be set (as described in S211), S210 includes S212 may function to set a sampling rate and/or a maximum sampled group size for monitoring and testing.

In one or more embodiments, S212 may function to set a sampling rate for a pool of possible holdout group candidates based on a preference of a subscriber. That is, a subscriber may function to set a desired sampling rate (e.g., sample 1 out of 20 adverse transactions, etc.). Additionally, or alternatively, S212 may function to set a sampling rate based on one or more threat service-generated recommendations. For instance, S212 may enable the threat service to generate or propose a sampling rate based on a level of activity associated with the subscriber (e.g., number of daily transactions, activity volume, etc.), an average value of each activity or transaction associated with the subscriber (e.g., higher value transactions should have a relatively lower sampling rate and lower value transaction should have relatively higher sampling rate to balance losses during insult monitoring, etc.).

Additionally, or alternatively, in one or more embodiments, S212 may function to generate a recommendation of an optimal sampling rate based on a volume of digital event or digital activity traffic through a given automated decisioning workflow computer for a given subscriber. In this way, the recommended sampling rate may function to allow a configuration of an optimal holdout group size for computing an insult rate that is statistically significant.

Additionally, or alternatively, S212 may function to set a maximum sampled group size, in one embodiment, based one or more of a predefined maximum number of required samples, as determined by a subscriber or the threat service. S212 may additionally or alternatively set a sampling or testing period defining a set amount of time that samples may be collected for purposes of evaluating and determining an insult rate or the like. For example, S212 may function to set a maximum sampled group size of 100 samples per monitoring period or some other subscriber-determined period (e.g., per month, per quarter, etc.).

In a variant, S212 may function to set a maximum sampled group size based on a predefined maximum value of the sampled members within the sampled group (i.e., possible holdout group). That is, in some embodiments, an aggregated value of the sampled members within the possible holdout group of candidates may not exceed a maximum value threshold. As an example, S212 may function to set a maximum aggregated value for a holdout group at $1000 and in such example, the aggregated value of the sampled members for a given holdout group may not exceed the maximum aggregated value of $1000; thus, limiting a loss exposure of a given subscriber to $1000. In such example, a relatively small number of sampled members (e.g., 3 transactions) may achieve the maximum aggregated value or a relatively large number of sampled members (e.g., 200 transactions) may achieve the maximum aggregated value.

Additionally, or alternatively, in one or more embodiments, S212 may function to implement random sampling such that, so long as one or more exclusionary parameters are satisfied, any suitable member or candidate within a pool of potential holdout group candidates may be selected. In a variant, in some embodiments, S212 may function to set selection criteria and/or selection preferences for selecting suitable testing candidates from pool of possible holdout group candidates. For instance, S212 may function to set a selection criteria for selecting activities, transactions, or events with threat scores that are closest to an adverse decisioning threat score within an automated workflow. That is, a sampling may be biased to select candidates for testing that with threat score that were marginally beyond n adverse decision or adverse threat score threshold.

Additionally, or alternatively, in one or more embodiments, S212 may function to evaluate activity traffic input to an automated decisioning workflow computer of a given subscriber to a low traffic threshold (e.g., a minimum number of events, activities, etc.) that, if satisfied, would cause S212 to recommend implementing the insult rate experimentation through a reviewing queue mechanism in lieu of a real-world testing and evaluation of each member of the testing group.

2.2 Monitoring|Evaluation

Figure 4:
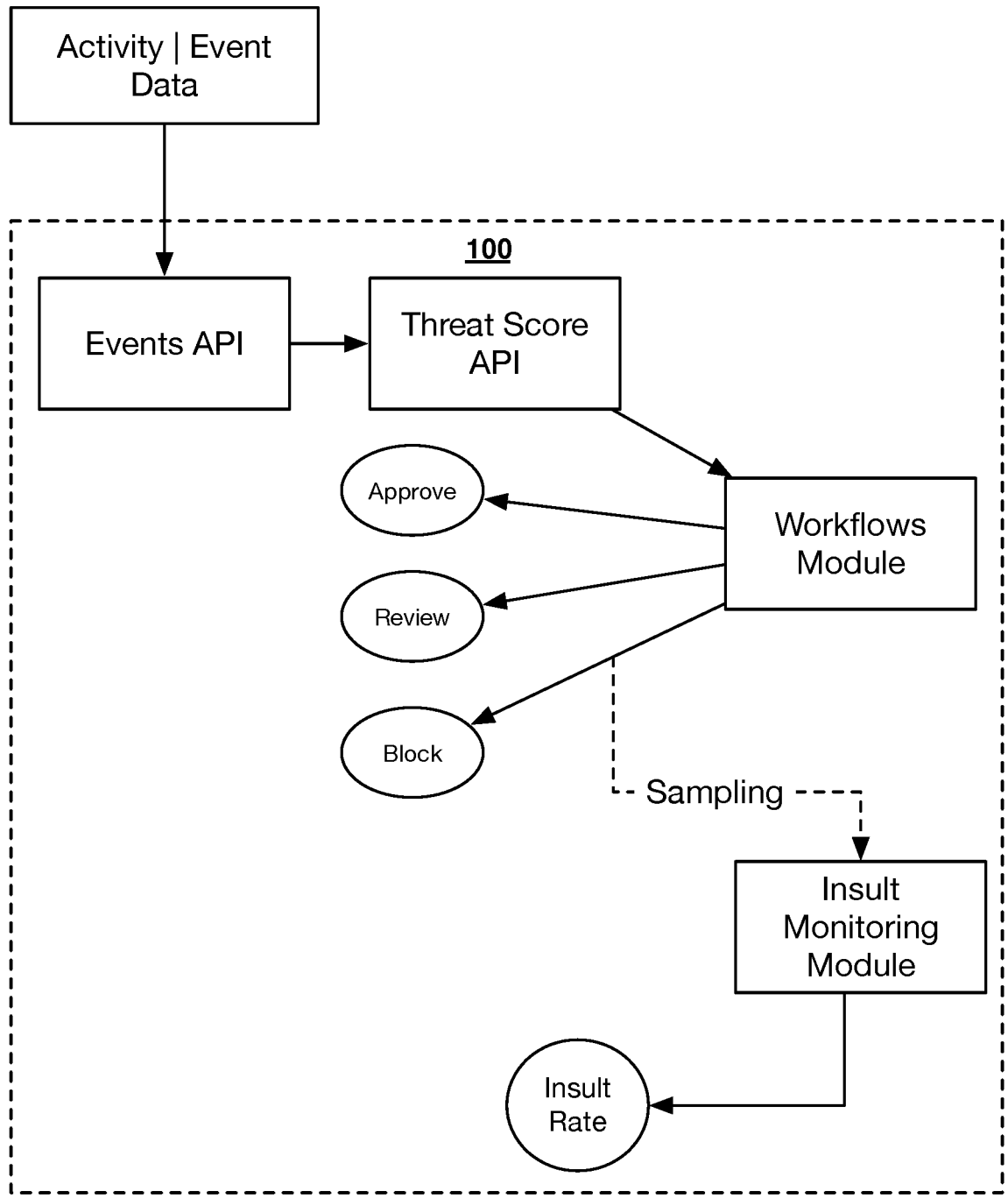
FIG. 4 illustrates a schematic example of a threat service integrated with insult rate monitoring in accordance with one or more embodiments of the present application.

As shown by way of example in FIG. 4, an insult monitoring module may be implemented following a workflows module that outputs automated decisioning including adverse decisions such as, for example, "block" or "disallow". S220, which includes implementing a monitoring and/or evaluation of a holdout test group, may function to implement an experimentation or testing of accepted or selected members of a holdout group.

In a first implementation, S220 may function to automatically accept or automatically allowing each candidate activity or event that is sampled into the holdout group for a given subscriber. In this first implementation, S220 may function to automatically allow an activity, an event, and/or a transaction that would have been originally blocked based on an adverse decision out of an automated workflow for a given subscriber.

In a second implementation, S220 may function to determine acceptance of a candidate into the holdout group based on a manual review of the candidate. In such embodiments, the candidate may not be automatically accepted into the holdout group; rather, S220 may function to further evaluate details or attributes of the candidate and produce a decision as to whether to include the candidate within the holdout group based on the evaluation.

In a third implementation, S220 may function to implement a combination of automatic acceptance and manual review of candidates for the holdout group. In this third implementation, S220 may include setting an auto acceptance threshold or a manual review threshold that directs a candidate either to an automatic acceptance into the holdout group or to an additional evaluation or review of the candidate that determines acceptance or denial into the holdout group. For instance, in some embodiments, the auto acceptance threshold may include a maximum threat score that if a threat score for a given candidate does not satisfy or falls below the maximum threat score or acceptance threshold, then S220 may function to automatically accept the given candidate into the holdout group. Similarly, the manual review threshold may include the maximum threat score such that candidates having a computed threat score that satisfies or exceeds the maximum threat score may be directed to a manual review process and may not be automatically accepted.

For each member of the holdout group that is accepted or allowed, S220 may additionally function to monitor the member over a predetermined period or the like. That is, in a preferred embodiment, S220 may function to track and/or measure an outcome or consequence of accepting or allowing the member to proceed along a normal course with the subscriber even if the member has a high probability of fraud, risk of loss, or threat to the subscriber. Accordingly, for each member of the holdout group that is accepted and that is being monitored, S220 may function to compute a loss or non-loss to the subscriber including measuring, for example, adverse or negative activity consequences, such as chargebacks, etc. (e.g., fees, loss of goods, and/or the like). Additionally, or alternatively, S220 may function to compute an aggregated loss for the holdout group which includes a sum of all losses across all member of the holdout group.

Additionally, or alternatively, in a preferred embodiment, S220 may function to enable an insult rate monitoring to automatically end. In such embodiment, S220 may implement a multi-part termination of the insult rate monitoring by first terminating a sampling of candidates into the holdout group after one of an expiry of a predetermined sampling period (e.g., 30 days) or satisfying one or more sampled group size parameters/thresholds (e.g., sampled group <=100 members). As a second part, S220 may function to automatically terminate the insult rate monitoring based on an expiry of a predetermined period of evaluation in which consequences of the accepted members may be collected and/or measured.

Additionally, or alternatively, in some embodiments, S220 may function to enable a manual termination of the insult rate monitoring ahead of a schedule termination if or when all accepted members return activity consequences prior to the scheduled termination or a measured loss of the holdout group exceeds a maximum loss threshold during the monitoring period and ahead of the schedule termination.

2.3 Computing Insult Rate|Compute Equilibrium

S230, which includes computing an insult rate and/or an insult rate equilibrium, may function to compute one or more of an insult rate that identifies a percentage of activities and/or events having an adjudged adverse disposal decision from an automated workflow that did not produce an observed negative activity consequence (e.g., percentage of False Positives or False Declines) toward a given subscriber. That is, in one or more embodiments, S230 may function to determine what portion of the members of a holdout group may have been good activities, events, good users, or transactions that may have incorrectly flagged as high risk, fraudulent, or bad by one or more automated decisioning workflows of a given subscriber.

Additionally, or alternatively, S230 may function to compute an insult rate equilibrium which identifies a point or an automated decisioning threshold value at which a cost of accepting and rejecting an activity, event, or transaction that was adjudged with an adverse disposal decision (e.g., block or cancel) may be equal. That is, in such embodiments, at a given threat score threshold of an automated decisioning workflow, a prospective loss resulting from a false positive indication of fraud (i.e., automatically disallowing or rejecting an event) of a good event or user by an automated decisioning workflow may be equal to a prospective gain resulting from an allowance of the good event or user.

2.31 Insult Rate

In one or more embodiments, computing an insult rate may include identifying a total number of members that were monitored and/or evaluated from a holdout group and identifying a number of the members that did not result in negative activity consequences (e.g., a chargeback, a loss or harm to the subscriber). That is, in some embodiments, at an end of a monitoring period for all members of a holdout (testing) group, S220 may function to identify a first number of the holdout members that did not result in a loss or harm to the subscriber and a second number that includes an aggregate number of members that were evaluated in the holdout group. Additionally, or alternatively, a third number of holdout members of the holdout group that did result in loss or harm to the subscriber may also be identified for purposes of identifying an efficacy of the one or more thresholds of an automated workflow in properly blocking or disallowing harmful or risky activities or transactions.

Accordingly, in computing the insult rate, S220 may function to identify a percentage or rate of insult based on a quotient value calculated by dividing the first number of (good) holdout members that did not result in a loss or harm by the second number that includes the aggregate number of members in the holdout group.

2.32 Insult Rate Equilibrium

Additionally, or alternatively, S230 may function to compute an insult rate equilibrium that identifies a baseline for insult rate that may be utilized for updating one or more risk or automated decisioning thresholds of an automated workflow. In a preferred embodiment, computing an insult rate equilibrium may include identifying a probability of missed threat or fraud (MFp), a cost or value of missed threat or fraud (MFc), and a cost or value of customer insult (Ic). In such embodiment, it may be assumed that a probability of a user or customer insult (Ip) may be a proxy for insult rate (IR) and that the probability of missed threat or fraud (MFp) is equal to (1−Ip). Accordingly, S230 may function to compute an insult rate equilibrium (IR) by solving the equation for Ip:

$$Ip*Ic=MFp*MFc \qquad (1)$$

$$Ip*Ic=(1-Ip)*MFc \qquad (2)$$

$$Ip=MFc/(MFc+Ic) \qquad (3)$$

Based on the above, the insult rate equilibrium may be a cost of missed fraud or threat divided by the sum of the cost of missed fraud and the cost of user insult.

In one or more embodiments, S230 may additionally or alternatively evaluate a computed insult rate from an insult rate testing to an insult rate equilibrium for a given subscriber to determine whether the computed insult rate from the testing is above or below the insult rate equilibrium. In the circumstance that is determined that the computed insult rate is above or higher than the insult rate equilibrium, S230 may determine that a cost of insult to users of a subscriber based on the adverse decisions of an automated workflow is higher than the probable cost of missed fraud. Conversely, if it is determined that the computed insult rate is below or lower than the insult rate equilibrium, S230 may determine that the probable cost of missed fraud higher than the cost of insult to users. In one or more embodiments, S240 may function to reconfigure and/or adjust one or more automated decisioning parameters (e.g., decision/disposal and/or routing thresholds, etc.) based on whether a computed insult rate is above or below a computed insult rate equilibrium for a given subscriber.

2.4 Reconfigure Automated Workflow Threshold(s)

S240, which includes reconfiguring one or more adverse decision thresholds, may function to adjust or update one or more adverse decision thresholds of an automated decisioning workflow for a given subscriber based on an evaluation of a computed insult rate to an insult rate equilibrium for the given subscriber. That is, S240 may function to adjust one or more adverse decisioning criteria (e.g., threat score thresholds) to optimize an insult rate to a subscriber-desired level.

In one embodiment, if a computed insult rate is higher than an insult rate equilibrium for a given subscriber, S240 may function to update one or more adverse decision thresholds of an automated workflow such that less activity evaluated within the automated workflow are evaluated adversely. For example, if an insult rate is higher than an insult rate equilibrium, S240 may function to increase a fraud or threat score threshold (e.g., from 90→95) for blocking transactions to reduce the number of transactions of a subscriber that are automatically blocked. In this example, it may be assumed that threat scores range from 0-100 and that threat score values approaching 100 indicate a higher probability of risk, threat, fraud, and/or abuse.

In another embodiment, if a computed insult rate is lower than an insult rate equilibrium for a given subscriber, S240 may function to update one or more adverse decision thresholds of an automated workflow such that more activity evaluated within the automated workflow are evaluated adversely.

Additionally, or alternatively, in one or more embodiments, S240 may function to adjust and/or update an adverse decision threshold of a given automated workflow dynamically and/or automatically based on a determination that a computed insult rate is higher or lower than an insult rate equilibrium for a given subscriber.

2.5 ML Improvements

Optionally, or additionally, S250, which includes improving subscriber-specific threat scoring machine learning models, may function to collect each of a plurality of false positives from the insult rate testing and compose a corpus of sample training data. In such embodiment, S250 may function to label each sample within the corpus as non-adverse or non-fraud samples and provide the corpus as training data input to one or more subscriber-specific machine learning models that produce threat scores for activities, events, or transactions under evaluation and that may eventually be handled by one or more automated workflows within the threat service. In turn, the subscriber-specific model may produce improved fraud or abuse predictions (e.g., threat scores) that may function to improve an insult rate for a given subscriber with limited to no periodic adjustments to adverse decisioning thresholds of an automated workflow.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for generating an insult rate and reconfiguring a machine learning-based automated decisioning workflow computer, the method comprising:

implementing an automated decisioning workflow computer that, based on inputs of a plurality of online events data, computes a plurality of automated disposal decisions that includes automatically allowing, holding, or disallowing each of a plurality of online events associated with the plurality of online events data;

configuring, via an application programming interface, a testing group based on sampling from the plurality of online events data having an adverse disposal decision computed by the automated decisioning workflow computer, wherein the automated decisioning workflow computer is configured with one or more machine learning-based threat score thresholds for computing each of the plurality of disposal decisions;

evaluating a performance and collecting performance data of a plurality of distinct members of the testing group over a testing period;

computing an insult rate for the testing group based on the performance data;

computing an insult rate equilibrium for the automated decisioning workflow computer based on the performance data;

evaluating the insult rate of the testing group against the insult rate equilibrium of the automated decisioning workflow computer;

computing one or more machine learning-based threat score threshold values for the one or more machine learning-based threat score thresholds of the automated decisioning workflow computer based on the insult rate equilibrium;

reconfiguring the one or more machine learning-based threat score thresholds of the automated decisioning workflow computer based on the computation of the one or more machine learning-based threat score threshold values thereby optimizing a decisioning operation of the automated decisioning workflow computer in handling future online events data; and implementing the automated decisioning workflow computer using the one or more machine learning-based threat score thresholds to compute the plurality of automated disposal decisions that moves a false positives rate of the automated decisioning workflow computer towards or away from the insult rate equilibrium.

2. The method according to claim 1, wherein evaluating the insult rate of the testing group against the insult rate equilibrium for the automated decisioning workflow computer includes:

identifying whether the insult rate of the testing group is greater than or less than the insult rate equilibrium of the automated decisioning workflow computer.

3. The method according to claim 2, wherein reconfiguring the one or more machine learning-based threat score thresholds of the automated decisioning workflow computer includes:

decreasing the one or more machine learning-based threat score thresholds of the automated decisioning workflow computer towards the insult rate equilibrium of the automated decisioning workflow computer if the insult rate of the testing group is greater than the insult rate equilibrium of the automated decisioning workflow computer.

4. The method according to claim 2, wherein
reconfiguring the one or more machine learning-based threat score thresholds of the automated decisioning workflow computer includes:
increasing the one or more machine learning-based threat score thresholds of the automated decisioning workflow computer towards the insult rate equilibrium of the automated decisioning workflow computer if the insult rate of the testing group is less than the insult rate equilibrium of the automated decisioning workflow computer.

5. The method according to claim 1, wherein
the one or more machine learning-based threat score thresholds comprise one or more machine learning-based threat scores selected from a scale of machine learning threat scores used for identifying a level of threat of a subject online event or a subject online user.

6. The method according to claim 5, wherein
reconfiguring the one or more machine learning-based threat score thresholds of the automated decisioning workflow computer includes:
resetting the one or more machine learning-based threat score thresholds to one or more new machine learning-based threat score threshold values distinct from the one or more machine learning-based threat score threshold values of the automated decisioning workflow computer.

7. The method according to claim 1, wherein
the testing group relates to a group of online events and/or a group of online users having machine learning-based threat scores that, when evaluated by the automated decisioning workflow computer, would cause the automated decisioning workflow computer to output a disposal decision for disallowing or for blocking each member of the group of online events and/or the group of online users.

8. The method according to claim 1, wherein
the insult rate of the testing group relates to a percentage of members of the testing group having an adjudged adverse disposal decision from the automated decisioning workflow computer that did not produce an observed negative activity consequence during the testing period.

9. The method according to claim 1, wherein
computing the insult rate of the testing group includes:
identifying a number of positive members of the testing group that did not result in a negative activity consequence during the testing period;
identifying an aggregate number of members of the testing group; and
computing a percentage of false positives based on a quotient value calculated by dividing the number of positive members by the aggregate number of members of the testing group.

10. The method according to claim 1, wherein
the insult rate equilibrium relates to a theoretical automated decisioning threshold value, if set for a given automated decisioning workflow computer, is a point at which a probable cost of automatically allowing and a probable cost of automatically disallowing an online event or an online user evaluated through the automated decisioning workflow computer may be equal.

11. The method according to claim 1, wherein
computing the insult rate equilibrium of the automated decisioning workflow computer includes:
(i) identifying a probability of a missed threat,
(ii) identifying a cost value of the missed threat,
(iii) identifying a cost value of a false positive decision,
(iv) summing the cost value of the missed threat and the cost value of the false positive decision; and
(v) computing the cost value of the missed threat divided by the sum of the cost value of the missed threat and the cost value of the false positive decision.

12. The method according to claim 1, wherein
configuring the testing group includes:
selecting as members of the testing group a subset of the plurality of online events data sampled from the plurality of online events data having the adverse disposal decision computed by the automated decisioning workflow computer.

13. The method according to claim 12, wherein
selecting the subset includes:
automatically accepting online events having a machine learning-based threat score that satisfies an acceptance threshold for the testing group.

14. The method according to claim 1, wherein
configuring the testing group includes:
setting one or more exclusionary parameters that exclude specific candidate members from the sampling of the plurality of online events data having the adverse disposal decision computed by the automated decisioning workflow computer.

15. The method according to claim 1, further comprising:
tracking each member of the testing group during the testing period; and
identifying whether each member produces a positive outcome or a negative outcome based on the tracking.

16. A system for generating an insult rate and reconfiguring a machine learning-based threshold of an automated decisioning workflow computer of a machine learning-based system for identifying and mitigating digital threats, the system comprising:
an automated decisioning workflow computer that, based on inputs of a plurality of online events data, computes a plurality of automated disposal decisions that includes automatically allowing, holding, or disallowing each of a plurality of online events associated with the plurality of online events data;
a distributed network of computers implementing a machine learning-based digital threat mitigation service that:
configures a testing group based on sampling from the plurality of online events data having an adverse disposal decision computed by the automated decisioning workflow computer, wherein the automated decisioning workflow computer is configured with one or more machine learning-based threat score thresholds computing each of the plurality of disposal decisions;
evaluates a performance and collects performance data of a plurality of distinct members of the testing group over a testing period;
computes an insult rate for the testing group based on the performance data;
computes an insult rate equilibrium for the automated decisioning workflow computer based on the performance data;

evaluates the insult rate of the testing group against the insult rate equilibrium of the automated decisioning workflow computer;

computes one or more machine learning-based threat score threshold values for the one or more machine learning-based threat score thresholds of the automated decisioning workflow computer based on the insult rate equilibrium;

reconfigures the one or more machine learning-based threat score thresholds of the automated decisioning workflow computer based on the computation of the one or more machine learning-based threat score threshold values thereby optimizing a decisioning operation of the automated decisioning workflow computer in handling future online events data; and wherein the automated decisioning workflow computer uses the one or more machine learning-based threat score thresholds to compute the plurality of automated disposal decisions that moves a false positives rate of the automated decisioning workflow computer towards or away from the insult rate equilibrium.

17. The system according to claim 16, wherein
the one or more machine learning-based threat score thresholds comprise one or more machine learning-based threat scores selected from a scale of machine learning threat scores used for identifying a level of threat of a subject online event or a subject online user.

18. The system according to claim 17, wherein,
when the distributed network of computers reconfigures the one or more machine learning-based threat score thresholds of the automated decisioning workflow computer:

the distributed network of computers further resets the one or more machine learning-based threat score thresholds to one or more new machine learning-based threat score threshold values distinct from the one or more machine learning-based threat score threshold values of the automated decisioning workflow computer.

19. The system according to claim 16, wherein
the testing group relates to a group of online events and/or a group of online users having machine learning-based threat scores that, when evaluated by the automated decisioning workflow computer, would cause the automated decisioning workflow computer to output a disposal decision for disallowing or for blocking each member of the group of online events and/or the group of online users.

\* \* \* \* \*